(12) United States Patent
Glomset et al.

(10) Patent No.: US 8,556,236 B2
(45) Date of Patent: Oct. 15, 2013

(54) DEVICE FOR SUPPLYING GAS INTO WATER

(75) Inventors: Kenneth Glomset, Alesund (NO); Ove Gjelstenli, Vatne (NO)

(73) Assignee: Linde Aktiengesellschaft, Munich (DE)

( * ) Notice: Subject to any disclaimer, the term of this patent is extended or adjusted under 35 U.S.C. 154(b) by 385 days.

(21) Appl. No.: 12/902,179

(22) Filed: Oct. 12, 2010

(65) Prior Publication Data
US 2011/0248413 A1 Oct. 13, 2011

(30) Foreign Application Priority Data

Nov. 13, 2009 (EP) .................................... 09014227

(51) Int. Cl.
*B01F 3/04* (2006.01)

(52) U.S. Cl.
USPC ............... 261/76; 261/79.2; 261/83; 261/113

(58) Field of Classification Search
USPC ..................... 261/76, 79.2, 83, 113
See application file for complete search history.

(56) References Cited

U.S. PATENT DOCUMENTS

| | | | | |
|---|---|---|---|---|
| 3,105,778 A * | 10/1963 | Anderson | ...... | 127/69 |
| 4,283,255 A * | 8/1981 | Ramshaw et al. | ...... | 203/49 |
| 4,382,045 A * | 5/1983 | Wem | ...... | 261/89 |
| 4,382,900 A * | 5/1983 | Wem | ...... | 261/89 |
| 4,505,865 A * | 3/1985 | Wullenkord | ...... | 261/44.1 |
| 4,556,523 A * | 12/1985 | Lecoffre et al. | ...... | 261/123 |
| 4,627,890 A * | 12/1986 | Porter et al. | ...... | 202/235 |
| 4,692,283 A * | 9/1987 | Wem et al. | ...... | 261/89 |
| 4,731,159 A * | 3/1988 | Porter et al. | ...... | 159/6.1 |
| 4,970,030 A * | 11/1990 | Prudhon et al. | ...... | 261/79.2 |
| 5,055,186 A | 10/1991 | Van Toever | | |
| 5,363,909 A * | 11/1994 | Acharya et al. | ...... | 165/111 |
| 5,421,383 A | 6/1995 | Schmid | | |
| 6,565,070 B2 | 5/2003 | Batterham et al. | | |
| 7,533,874 B2 | 5/2009 | Glomset | | |
| 2005/0275119 A1* | 12/2005 | Glomset | ...... | 261/76 |
| 2006/0192034 A1 | 8/2006 | Gavin | | |
| 2010/0200069 A1* | 8/2010 | Glomset et al. | ...... | 137/1 |

FOREIGN PATENT DOCUMENTS

| | | |
|---|---|---|
| EP | 2 008 513 A1 | 12/2008 |
| EP | 2 198 704 A1 | 6/2010 |
| JP | 2006 136777 A | 6/2006 |

OTHER PUBLICATIONS

Steinar Skybakmoen, Fish Rearing Tanks, Sintef NHL Norwegian Hydrotechnical Laboratorium Brochure, Apr. 1991, pp. 1-13, Publisher: AGA AS, Oslo, Norway.

* cited by examiner

*Primary Examiner* — Charles Bushey
(74) *Attorney, Agent, or Firm* — Joshua L. Cohen

(57) ABSTRACT

A device is provided for supplying gas into water, especially for aquaculture, including a water inlet arrangement with a pipe having a first plurality of openings and a Venturi type gas dissolver unit built in the pipe, and a surrounding second element having a second plurality of openings and/or a fixed or adjustable shield.

8 Claims, 5 Drawing Sheets

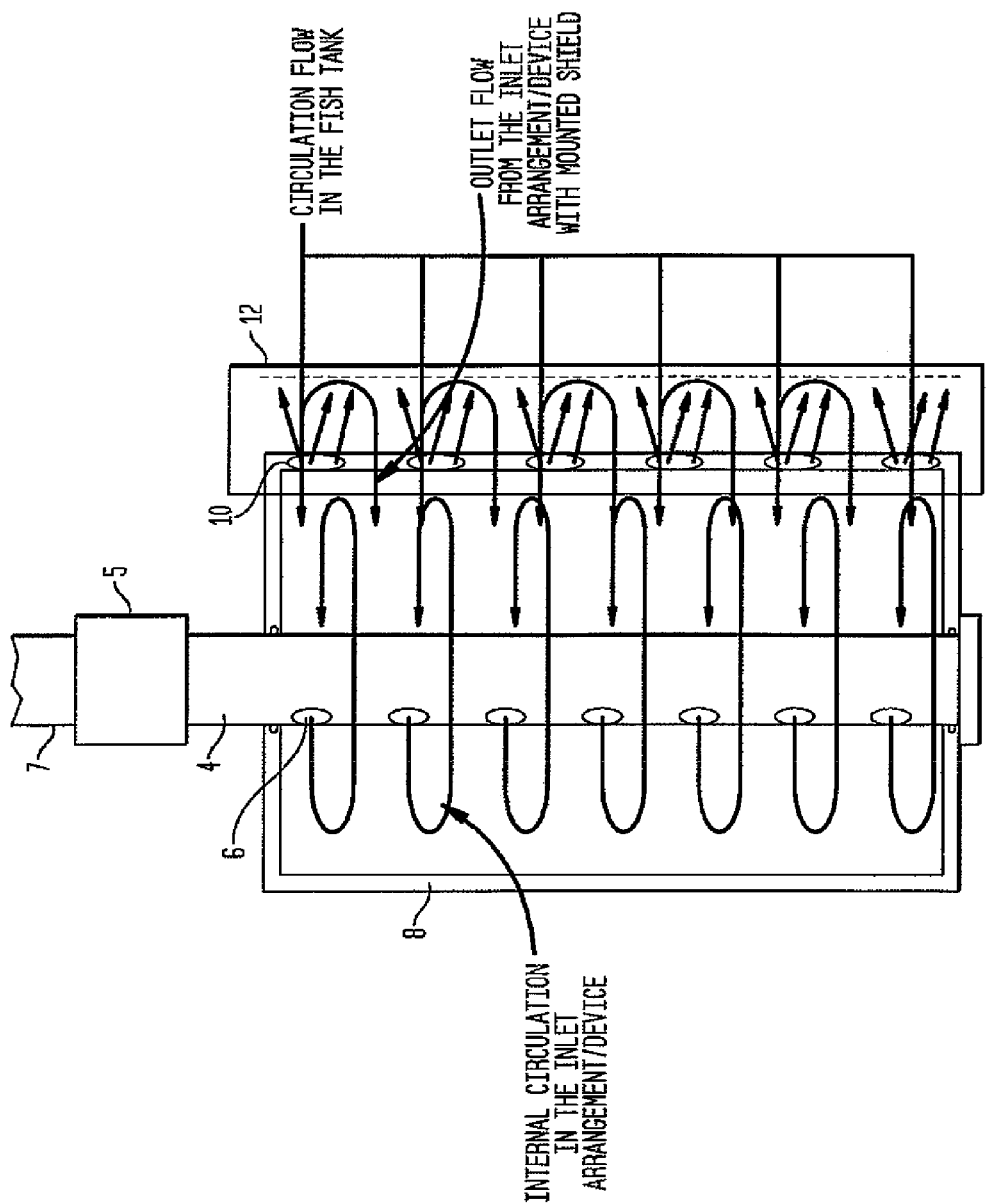

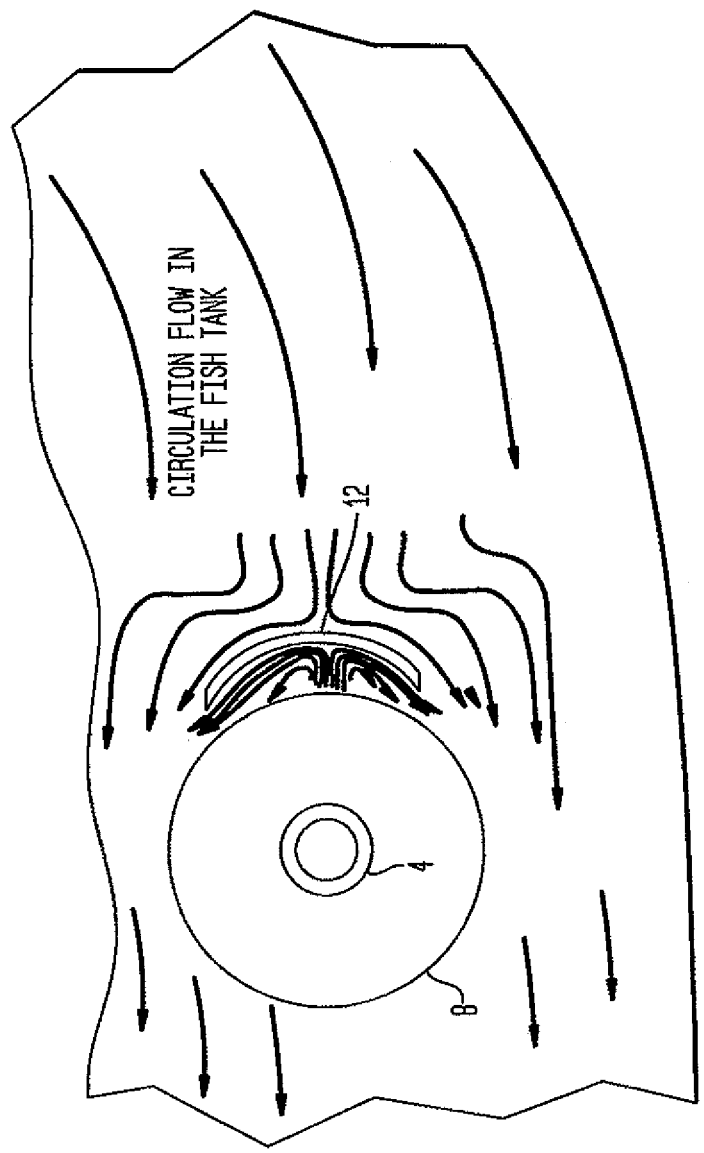

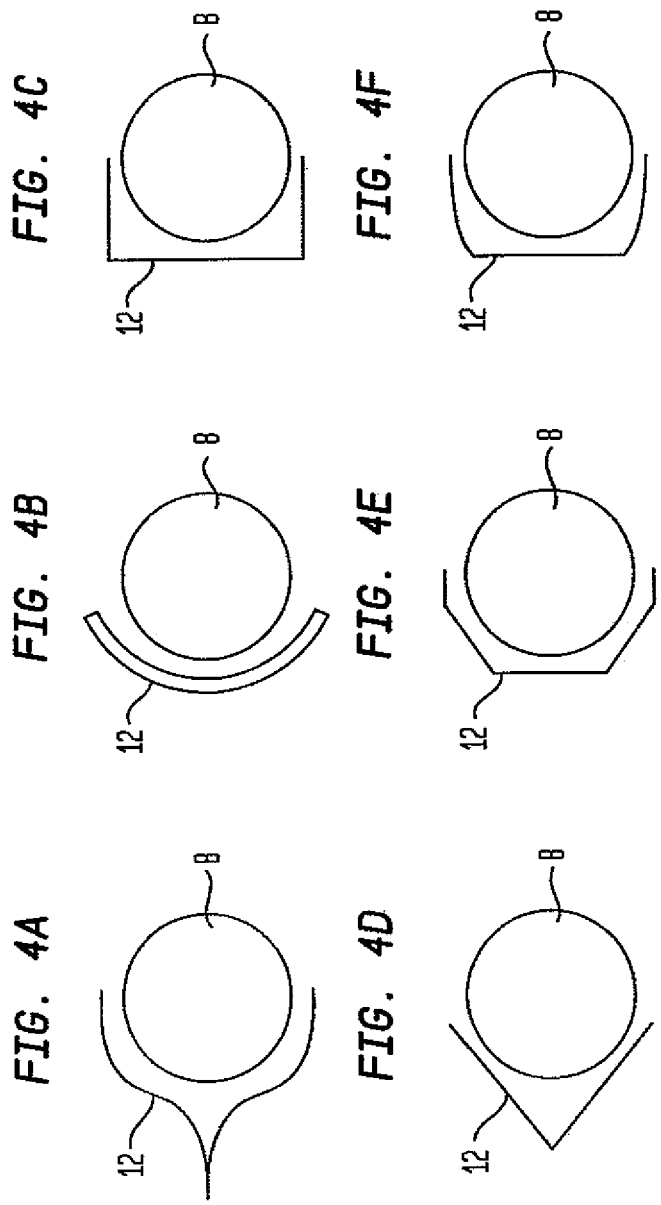

DEVICE FOR SUPPLYING GAS INTO WATER

BACKGROUND OF THE INVENTION

The present invention relates to a device for supplying gas into water combined with a water inlet arrangement. This can be used in tanks, ponds and sea cages.

In aquaculture it is important that the content of dissolved oxygen in the water is kept optimal. This is necessary for the health and the growing of the fish. Because the solubility of gases in water is reduced by increasing the temperature while the oxygen need of the fish is increasing at high temperature, there is a particularly great need for oxygen in warm periods. Increasing the capacity of oxygen dissolvers is, therefore, highly useful for the fish farmer. In addition, most of the fish hatcheries produce more fish per liter water than the installation originally was dimensioned. The amount of water is, therefore, the limiting factor of the installation. A better utilization of the water, a higher consumption of the oxygen and an improved dissolving capacity are therefore required.

Most hatcheries use pressurized oxygen dissolvers with a working pressure of 1-4 bars. By small amounts of water, it is normal to let all of the water flow go through the dissolver, but most commonly there is an outlet leading a part of the flow from the main pipe to a booster pump which pressurizes the dissolver. The oxygenated water is thereafter led back to the main pipe where it is mixed with untreated water. Most dissolving systems use 0-2.5 kWh per kilo $O_2$ dissolved, depending on efficiency and available water pressure.

US 2005/0275119A1 and the related EP 1 598 106 A3 describe an oxygenating nozzle unit for the injection of gas in a liquid flow. The arrangement can for example be mounted on any pipe transporting liquid and with a need for the supply of gas, for example on the pipe supply to the basin for the farming of fish, on the pipe after circulation pump on a boat for live fish transportation, on the pipe after a circulation pump for vehicles for live fish transportation, on the pipe after a circulation pump on a container, or other arrangement for live fish transportation or on pressurized dissolvers for increasing the oxygenating capacity. The known venturi system generates micro bubbles in sea water. By the means of gas diffusion and redistribution of dissolved gas components in water, one can dissolve and add gas at a very low pressure, preferred for sea water applications.

EP 2 008 513 A1 discloses a water inlet arrangement for the use in fish tanks in aquaculture with a pipe to feed water into the tank, whereby the pipe has a plurality of openings. For a better adjustment of the flow a surrounding second element, having a plurality of openings, and/or a fixed or adjustable shield are provided.

This arrangement improves the water circulation in the tank. The document is silent about where and how the oxygen is supplied.

The not yet published European application 08022177.3 proposes a device for supplying gas into water in sea cages, tanks or ponds with a submerged pump and a dissolver for the gas. The oxygen enriched water is fed into the sea cage/tank/pond by a "normal" nozzle, a tube with holes or a perforated hose.

Objects of the Invention

The problems to be solved by the invention are:

To oxygenate and create good hydraulic conditions in a fish basin at a lowest possible energy consumption, for individual oxygenation into every fish basin.

To reduce the amount of dissolved nitrogen and thereby the total gas pressure in the water introduced into the fish tank. This will eliminate the possible problem of bends disease.

These problems are solved by embodiments of the device claimed herein. Details of the water inlet arrangement used in this invention are disclosed in the EP 2 008 513 A1, which is incorporated herein by reference.

The invention is built from an inner pipe and an outer pipe. The parts are easy to disassemble to allow proper cleaning and disinfection. The Venturi/dissolver is situated in the inlet of the inner pipe. The holes/openings in the inner pipe "shoot" the water out into the volume of the outer pipe and create turbulence. This turbulence prevents the gas bubbles in the water flow from combining to form larger gas bubbles (coalescence). This will increase efficiency and transfer speed between gas and liquid. The rotation and the design/placement of the holes/openings in the inner pipe will equalize the water pressure in the outer pipe. This will again create equal water flow/water speed/water energy from all of the holes/openings in the outer pipe. The invention has no moving parts and, therefore, needs no maintenance except cleaning and possible disinfection.

The oxygen dissolving unit can be from any known type, especially a Venturi type, but the best solution is if the device is from the overlapping nozzle type like that disclosed in EP 1 598 106 A. The whole content of this document is part of the disclosure of this application.

Adding oxygen to fish tanks, sea cages or ponds in aquaculture with this embodiment creates good hydraulic conditions in the fish basin and homogeneous distribution of oxygen. This can be done with around 0.5 meter of water column available head pressure, depending on installation. With the invention we are able to oxygenate individually into every single basin with an easy installable/removable unit. The situation of the Venturi secures that there is no degassing in the piping into the basin, which is a known problem. This is because the gas is introduced directly into the basin below the water surface and the oxygenated water is thereby always kept under pressure.

Areas of application can be in all situations where water is to be distributed into a tank/pool/basin, preferably in breeding of fish or other organisms living in water, but can also be used in open areas such as lakes or rivers. Also it is possible to use this device for adding oxygen to sewage water or to expel unwanted gases out of water or another liquid. Adding any other gas can so be used to reduce the concentration of unwanted gas, like nitrogen or carbon dioxide. It is also possible to use the device for adding carbon dioxide to water.

The invention has the following advantages:
Reduced need of water pressure thus reducing energy demand.
Easier installation.
Reduced cost and complexity of installation.
No degassing in water pipe system.
Eliminates the need of plastic valves as water is oxygenated after it has passed the valves (reduced potential of corrosion).
Reduced possibility for mistakes during installation, as complexity is reduced and vulnerable parts of the oxygenating process are taken away, e.g. possible degassing zones in pipe system at lowered pressures.
Achieve a good and homogenous circulation throughout the whole water column.
Give self cleaning in the tank regarding waste products like feces, etc.
Good and even distribution of feed particles at inner tank.

Good and even distribution and mixing of oxygen or other gases in the tank.

To be able to increase efficiency of oxygenating processes.

Reduce degassing in the situation where over or super saturated water is introduced into a basin.

Eliminate the need for aeration of inlet water.

Reduce nitrogen levels in water and thereby reduce total gas pressure in water.

Easier adjustment of flow direction in basin.

Easier cleaning and disinfection.

In sweet water installations this invention will increase oxygen concentration, reduce nitrogen concentration as a good alternative to other aeration methods.

The invention can be manufactured from various materials. Preferably it is made from non-corrosive materials such as polypropylene, polyoxymethylene or polyvinyl-chloride or any other plastic.

BRIEF DESCRIPTION OF THE DRAWINGS

The invention is further described in more detail by the following drawings which show:

FIGS. 3A and 3B: a third embodiment of the invention;

FIGS. 4A-4F: examples of shields for the invention.

DETAILED DESCRIPTION OF THE INVENTION

Figure 1:
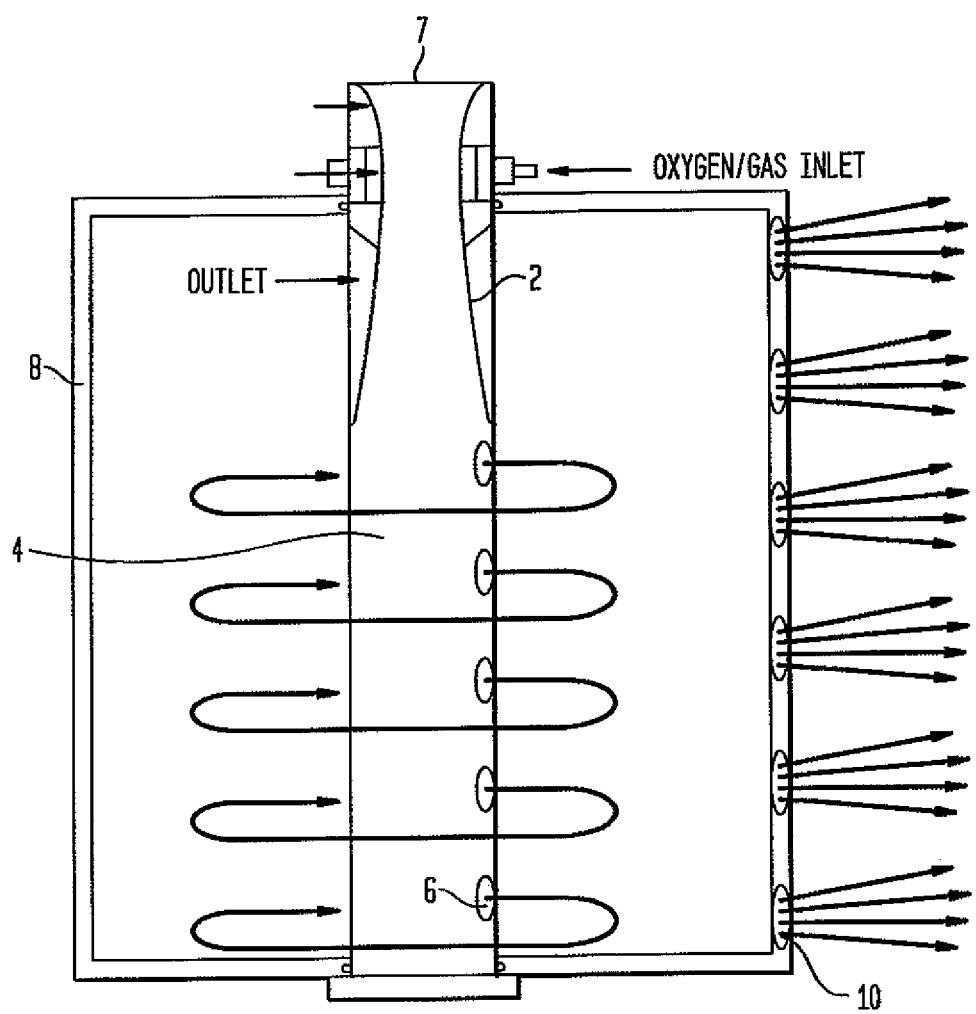
FIG. 1: an embodiment of an oxygenating device according to the invention.

FIG. 1 shows a pipe 4 which is connected to a water inlet pipe 7 by the means of a muff coupling 5 or a flange. In the pipe 4 there is arranged a gas dissolving unit 2 of the Venturi type. The pipe 4 is surrounded by a second element 8, which has here the form of a cylinder. The pipe 4 has a row/rows of openings 6 for feeding the water into the volume between the pipe 4 and the second element 8. The second element 8 has also a row of openings 10 for feeding the water into the tank/pond/sea cage (see FIG. 3). The turbulence or rotation is generated by the differing orientation of the row/rows of holes 6 in the pipe 4.

Figure 2:
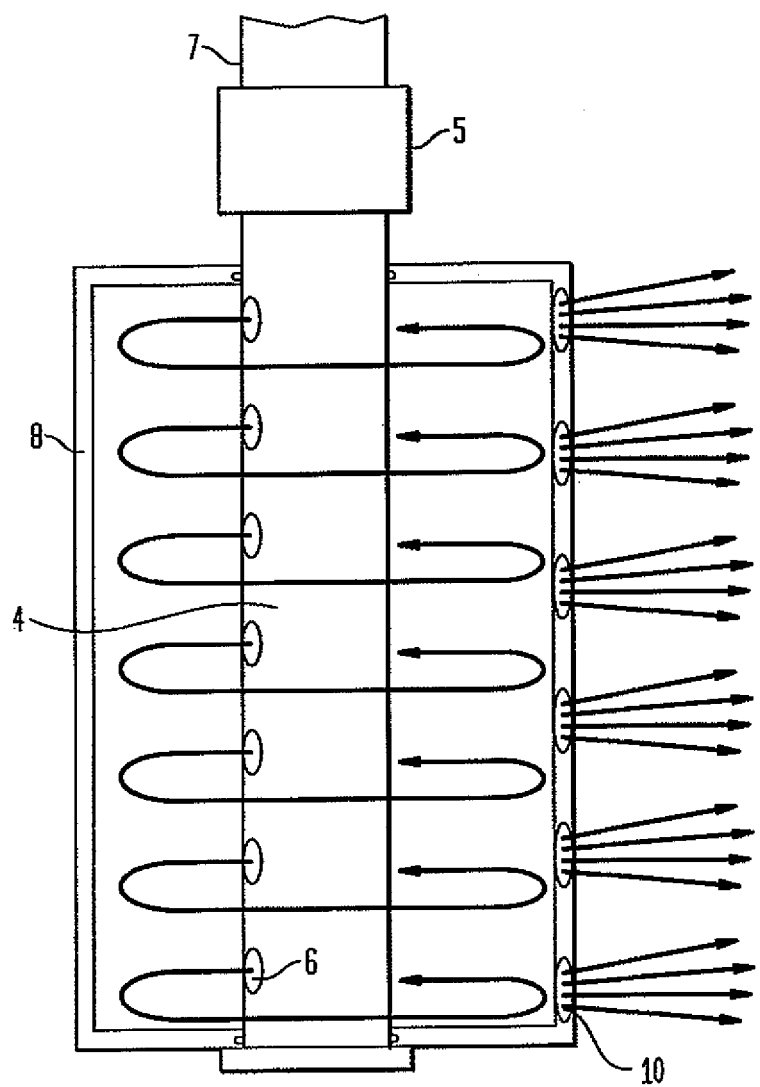
FIG. 2: another embodiment of the invention.

FIG. 2 shows another embodiment. The gas dissolver unit is incorporated in the pipe 4. The orientation of the openings 6 is chosen different from the orientation in FIG. 1, namely more or less opposite.

FIG. 3 shows another embodiment of the invention drawn schematically, while FIG. 3B shows the embodiment in a tank. FIGS. 3A, 3B show the pipe 4, surrounded by the second element 8 and the openings 10 for feeding the water into the tank. This embodiment has a shield 12. The shield 12 can be of different shapes/forms. The shape/form should be designated so that the water jet streams are forced to bend and turn. The shield 12 surrounds the second element on that place where the openings 10 are arranged. Shown is the circulation flow in the fish tank which is affected by the new element. The shield 12 surrounds the second element 8 or (not shown) the pipe 4 with a circumferential-angle of 60° to 200°, preferred 90° to 180°, this means between a quarter to one half.

FIGS. 4A-4F show six different shields 12 which can be used for example according to the invention. All shields 12 are arranged in neighborhood to the second element 8 and shield it against the flow in the fish tank. It can be adapted to the flow like the first example FIG. 4A, or a segment of a circle like the one in FIG. 4B. The third in FIG. 4C shows a rectangular shield 12. The fourth in FIG. 4D is acute-angled, while the fifth is a polygonal one in FIG. 4E. The last one shown in FIG. 4F has the rounded shape. It is shown that a lot of forms can be chosen without departing from the invention.

The invention claimed is:

1. A device for supplying gas into water, comprising:
a water inlet arrangement including a pipe having a first plurality of openings,
a Venturi type gas dissolver unit arranged in the pipe and having a separate gas inlet, said gas dissolver unit in communication with the first plurality of openings, and
a second element surrounding the pipe having a second plurality of openings and a shield.

2. The device of claim 1, wherein the gas dissolver unit is an overlapping nozzle type.

3. The device of claim 1, wherein the first plurality of openings are arranged in at least one row in the pipe.

4. The device of claim 1, wherein the second plurality of openings are oriented in a direction different than the first plurality of openings.

5. The device of claim 1, wherein the shield is adjustable.

6. The device of claim 1, wherein the second element is rotatable around the pipe.

7. The device of claim 1, wherein the second element can be dismantled from the pipe.

8. The device of claim 1, wherein the first plurality of openings are arranged in a plurality of rows in the pipe.

* * * * *